(12) United States Patent
Woodlief et al.

(10) Patent No.: US 12,103,033 B2
(45) Date of Patent: Oct. 1, 2024

(54) MODULAR ADHESIVE DISPENSING DEVICE

(71) Applicant: Nordson Corporation, Westlake, OH (US)

(72) Inventors: Robert J. Woodlief, Duluth, GA (US); David R. Jeter, Duluth, GA (US); Brian R. Sosebee, Duluth, GA (US); Leonard J. Lanier, Duluth, GA (US); Enes Ramosevac, Duluth, GA (US); Peter W. Estelle, Duluth, GA (US); Jeffrey E. Owen, Duluth, GA (US); James R. Beal, Duluth, GA (US); Leslie J. Varga, Duluth, GA (US); John Daniels, Duluth, GA (US); Ronald M. Ramspeck, Duluth, GA (US); John M. Riney, Duluth, GA (US)

(73) Assignee: Nordson Corporation, Westlake, OH (US)

( * ) Notice: Subject to any disclaimer, the term of this patent is extended or adjusted under 35 U.S.C. 154(b) by 204 days.

(21) Appl. No.: 17/761,798

(22) PCT Filed: Sep. 18, 2020

(86) PCT No.: PCT/US2020/051398
§ 371 (c)(1),
(2) Date: Mar. 18, 2022

(87) PCT Pub. No.: WO2021/055680
PCT Pub. Date: Mar. 25, 2021

(65) Prior Publication Data
US 2022/0339662 A1 Oct. 27, 2022

Related U.S. Application Data

(60) Provisional application No. 62/903,661, filed on Sep. 20, 2019.

(51) Int. Cl.
*B05C 5/02* (2006.01)
*B05C 11/10* (2006.01)
*B29B 13/02* (2006.01)

(52) U.S. Cl.
CPC ............ *B05C 11/1042* (2013.01); *B05C 5/02* (2013.01); *B29B 13/022* (2013.01)

(58) Field of Classification Search
CPC ...... B05C 11/1042; B05C 5/02; B29B 13/022
See application file for complete search history.

(56) References Cited

U.S. PATENT DOCUMENTS

| 4,850,425 A * | 7/1989 | Anderson | ............. B29B 13/022 |
| | | | 264/40.6 |
| 7,874,456 B2 * | 1/2011 | Bolyard, Jr. | ........ B05C 11/1042 |
| | | | 222/61 |

(Continued)

FOREIGN PATENT DOCUMENTS

| CN | 102441235 A | 5/2012 |
| CN | 104584691 A | 4/2015 |

(Continued)

OTHER PUBLICATIONS

IPEA/409—International Preliminary Report on Patentability Mailed on Mar. 31, 2022 for WO Application No. PCT/US20/051398.

(Continued)

*Primary Examiner* — Frederick C Nicolas
(74) *Attorney, Agent, or Firm* — BakerHostetler

(57) ABSTRACT

An adhesive dispensing device (10) includes a melt module (12) including a housing (78) that defines a receiving space to receive adhesive and a heater (114) to heat the housing to melt the adhesive, and a control module (14) releasably connected to the melt module. The control module includes a controller (36) to automatically recognize a characteristic associated with the melt module and operate the melt module using instructions stored on the controller that (Continued)

correspond to the characteristic of the melt module. A method of operating the adhesive dispensing device is also disclosed.

20 Claims, 10 Drawing Sheets

(56) References Cited

U.S. PATENT DOCUMENTS

| | | | |
|---|---|---|---|
| 8,784,935 B2* | 7/2014 | Pallante | B05C 9/14 |
| | | | 118/715 |
| 8,948,898 B2 | 2/2015 | Barkmann et al. | |
| 9,427,768 B2 | 8/2016 | Varga | |
| 2003/0221309 A1 | 12/2003 | Cole et al. | |
| 2004/0124255 A1 | 7/2004 | Heerdt | |
| 2005/0095359 A1* | 5/2005 | Pallante | B05C 11/1042 |
| | | | 427/207.1 |
| 2008/0190957 A1* | 8/2008 | Bolyard | B05C 11/1042 |
| | | | 222/1 |
| 2012/0089204 A1 | 4/2012 | Heinzler | |
| 2013/0105516 A1 | 5/2013 | Jeter | |
| 2014/0001972 A1 | 1/2014 | Harris et al. | |
| 2014/0014683 A1* | 1/2014 | Owen | B05C 11/1044 |
| | | | 222/54 |
| 2014/0117050 A1 | 5/2014 | Beal et al. | |
| 2015/0283280 A1 | 10/2015 | Belongia | |
| 2016/0121358 A1 | 5/2016 | Gould et al. | |
| 2020/0331168 A1* | 10/2020 | Ganzer | B29B 13/022 |
| 2020/0353648 A1* | 11/2020 | Guerrero | H04W 72/23 |
| 2022/0339661 A1* | 10/2022 | Woodlief | B05C 11/1042 |
| 2022/0371285 A1* | 11/2022 | Estelle | B05C 11/1002 |

FOREIGN PATENT DOCUMENTS

| | | |
|---|---|---|
| CN | 106456819 A | 2/2017 |
| CN | 106852108 A | 6/2017 |
| CN | 107321565 A | 11/2017 |
| EP | 1437303 A2 | 7/2004 |
| EP | 2442970 B1 | 1/2016 |
| WO | 2008/100726 A1 | 8/2008 |

OTHER PUBLICATIONS

ISA/220—Notification of Transmittal or Search Report and Written Opinion of the ISA, or the Declaration Mailed on Dec. 15, 2020 for WO Application No. PCT/US20/051398.

Observations by third parties Mailed on Mar. 23, 2022 for EP Application No. 20781728.

Third party observation Mailed on Apr. 6, 2021 for WO Application No. PCT/US20/051398, 9 page(s).

* cited by examiner

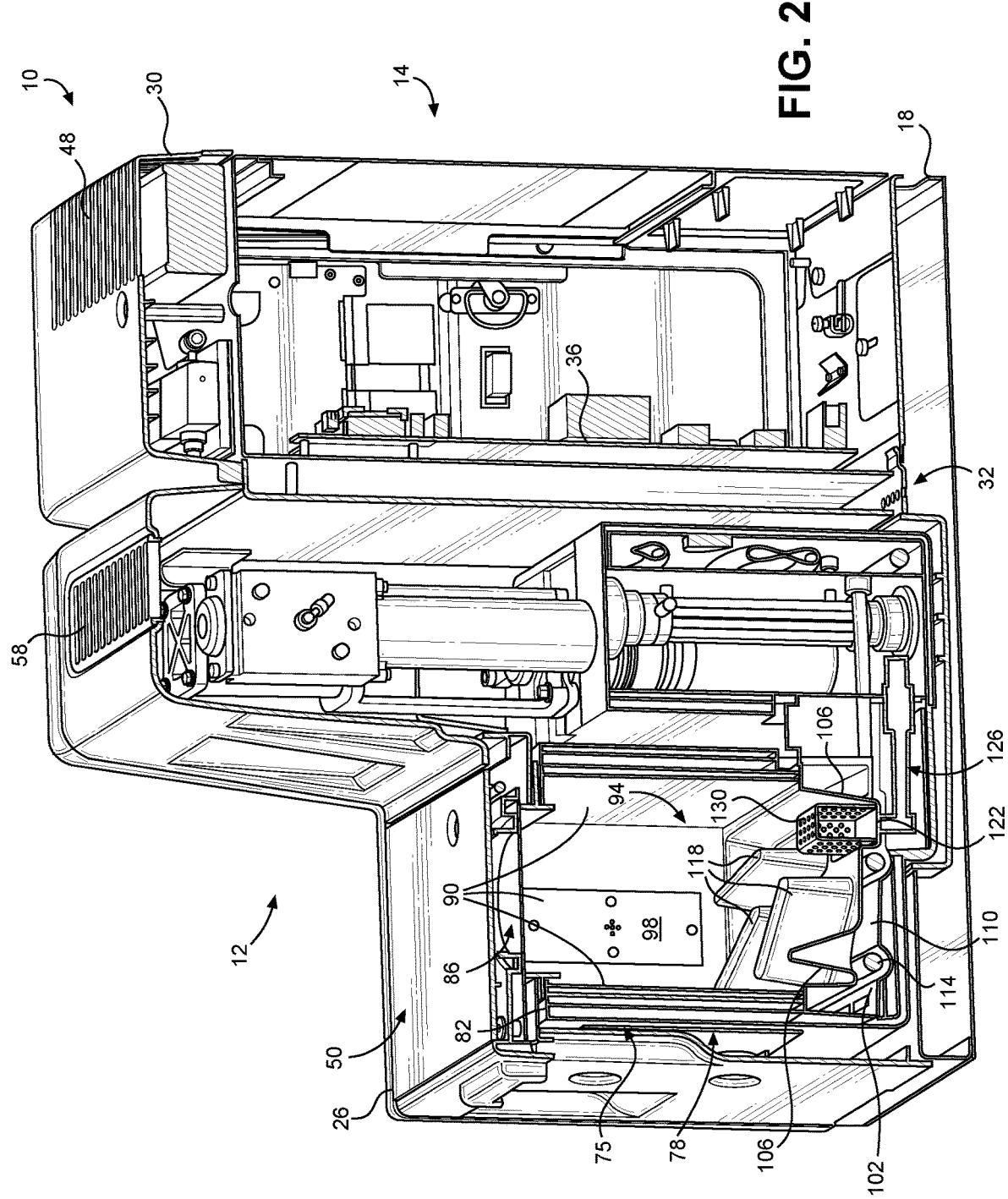

MODULAR ADHESIVE DISPENSING DEVICE

CROSS-REFERENCE TO RELATED APPLICATIONS

This application is a National Stage Application of International Patent Application No. PCT/US2020/051398, filed Sep. 18, 2020, which claims priority to U.S. Provisional Application No. 62/903,661 filed Sep. 20, 2019, which is incorporated by reference in its entirety.

TECHNICAL FIELD

The present disclosure generally relates to adhesive dispensing devices, and, more particularly, to adhesive dispensing devices including modular aspects.

BACKGROUND

In adhesive melting and dispensing operations, many different types of adhesive dispensing devices can be utilized. Each type of adhesive dispensing device can have individualized characteristics that enhance its usefulness in certain melting and dispensing operations. However, this can be costly to a device operator, as conventionally a wholly new device may be required when a new melting and/or dispensing operation is to be performed. Alternatively, certain devices may be capable of being modified to accommodate new operations, though additional materials and components may be required in order to make this possible, thus further increasing operational costs for the operator. Additionally, each type of adhesive dispensing device may have a different shape and/or size, which can lead to difficulties for an operator when organizing an adhesive processing area.

Therefore, there is a need for an adhesive dispensing device that can be easily reconfigured by an operator to perform a variety of melting and/or dispensing operations.

SUMMARY

An embodiment of the present disclosure is an adhesive dispensing device that includes a melt module including a housing that defines a receiving space configured to receive adhesive and a heater configured to heat the housing to melt the adhesive. The adhesive dispensing device also includes a control module releasably connected to the melt module, where the control module includes a controller configured to automatically recognize a characteristic associated with the melt module and operate the melt module using instructions stored on the controller that correspond to the characteristic of the melt module.

Another embodiment of the present disclosure is a method of operating an adhesive dispensing device. The method includes attaching a melt module to a control module that includes a controller and recognizing, via the controller, a characteristic associated with the melt module. The method also includes operating, via the controller, the melt module using instructions stored on the controller that correspond to the characteristic of the melt module.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

FIG. 2 illustrates a cross-sectional view of the adhesive dispensing device shown in FIG. 1A, taken along line 2-2 shown in FIG. 1A;

DETAILED DESCRIPTION OF ILLUSTRATIVE EMBODIMENTS

Figure 1A:
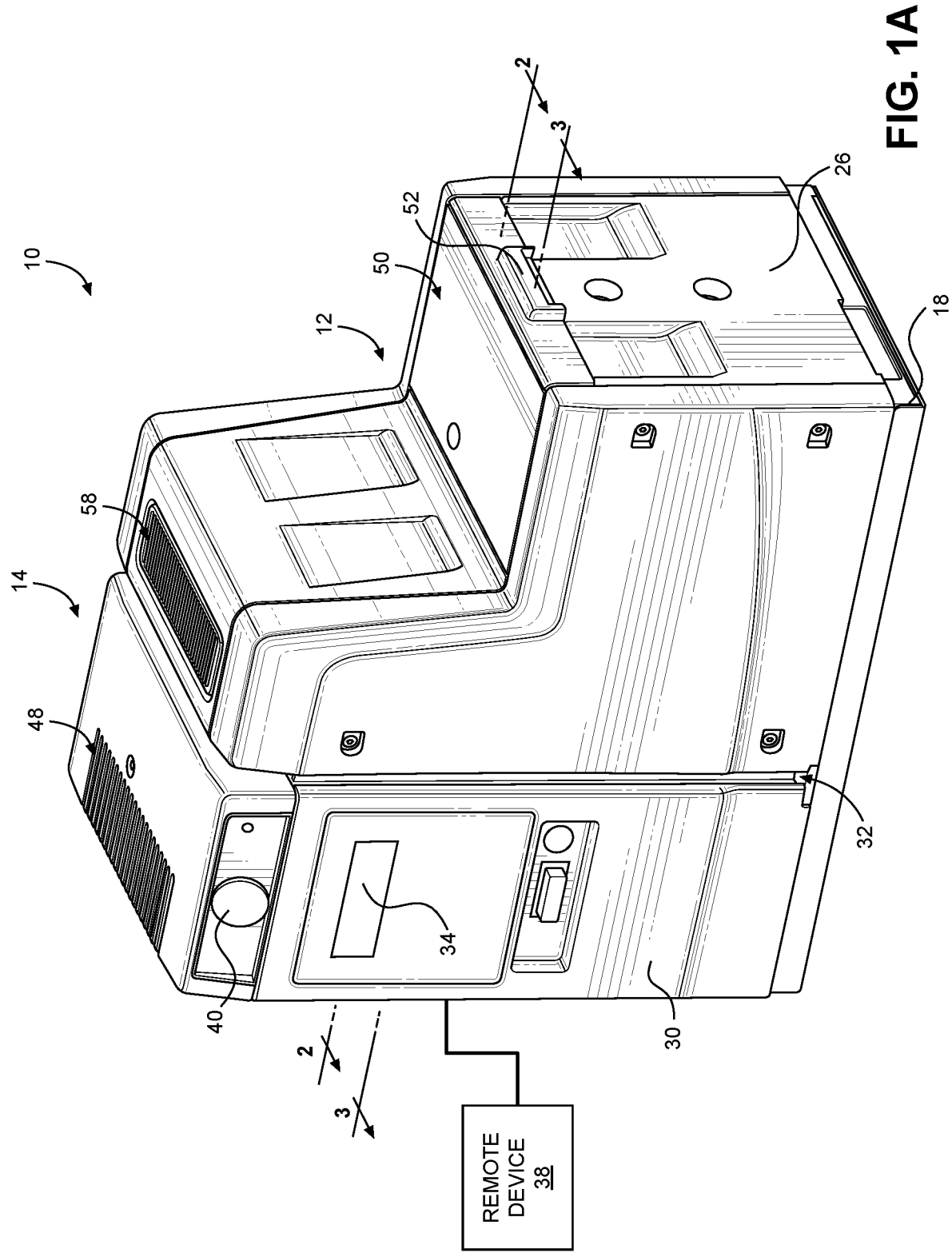
FIG. 1A illustrates a perspective view of an adhesive dispensing device according to an embodiment of the present disclosure.

Referring to FIGS. 1A-3, a modular adhesive dispensing device 10 in accordance with one embodiment of the invention is shown. The adhesive dispensing device 10 includes a melt module 12 and a control module 14 electrically and/or physically coupled to the melt module 12. The melt module 12 is configured to include the components related to receiving solid adhesive and melting the solid adhesive, whereas the control module 14 is configured to include the electronic components for controlling operation of the melt module 12, where each of the melt module 12 and the control module 14 will be described in detail further below. Each of the melt module 12 and the control module 14 can be mounted to and supported by a base 18. The base 18 can comprise a metal body and is configured to releasably couple to each of the melt module 12 and the control module 14, such as through fasteners that can comprise bolts, screws, etc., though it is contemplated that the melt module 12 and the control module 14 can be alternatively coupled to the base 18 in other embodiments. The adhesive dispensing device 10 is modular in nature, and as such either or both of the melt module 12 and control module 14 can be detached from the adhesive dispensing device 10 and replaced with alternatively configured melt modules and control modules, as will be described further below.

When the melt module 12 and the control module 14 are coupled to the base 18, a thermal gap 32 can be defined between the melt module 12 and the control module 14. The thermal gap 32 can be configured to minimize and/or substantially eliminate heat transfer from the melt module 12 to the control module 14 so as to prevent damage to the electronic components contained by the control module 14 caused by the heat created by the melt module 12. The thermal gap 32 can comprise a space between the melt module 12 and the control module 14. Additionally, it is contemplated that the thermal gap 32 can further include materials configured to prevent heat transfer, such as various types of insulation, though any specific type of material or structure is not required.

Figure 1B:
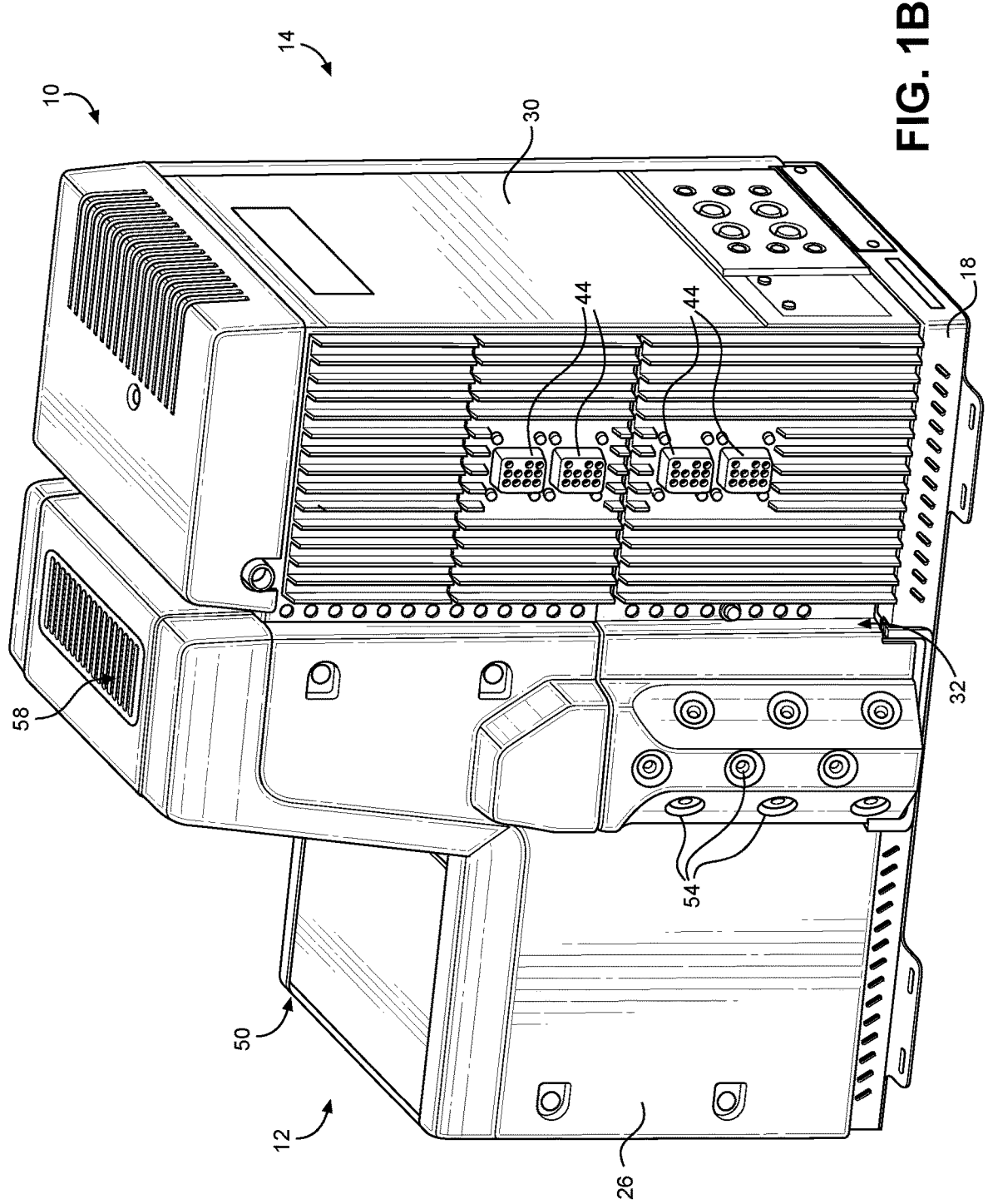
FIG. 1B illustrates an alternative perspective view of the adhesive dispensing device shown in FIG. 1A.
Figure 1C:
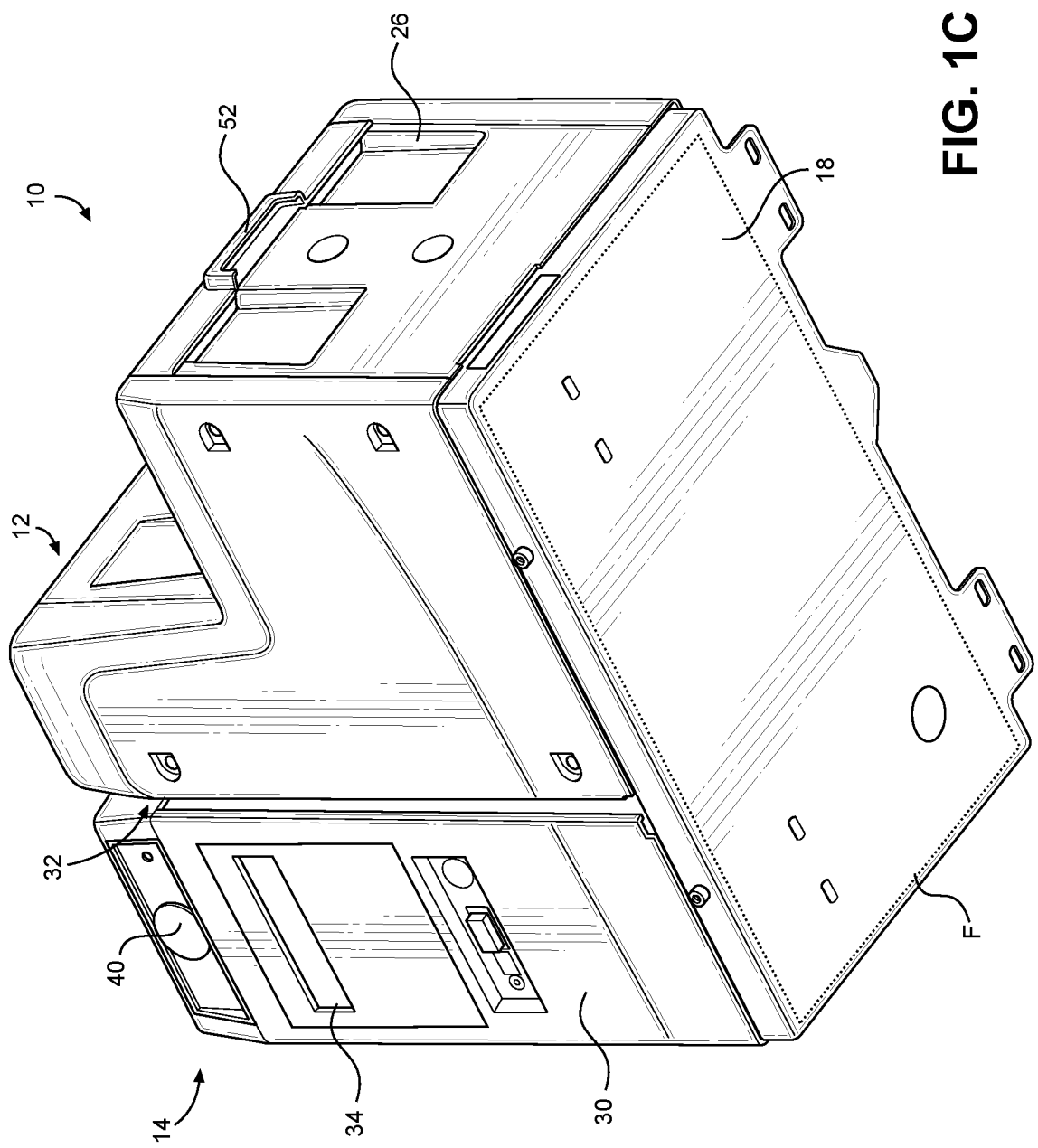
FIG. 1C illustrates another alternative perspective view of the adhesive dispensing device shown in FIG. 1A.
Figure 3:
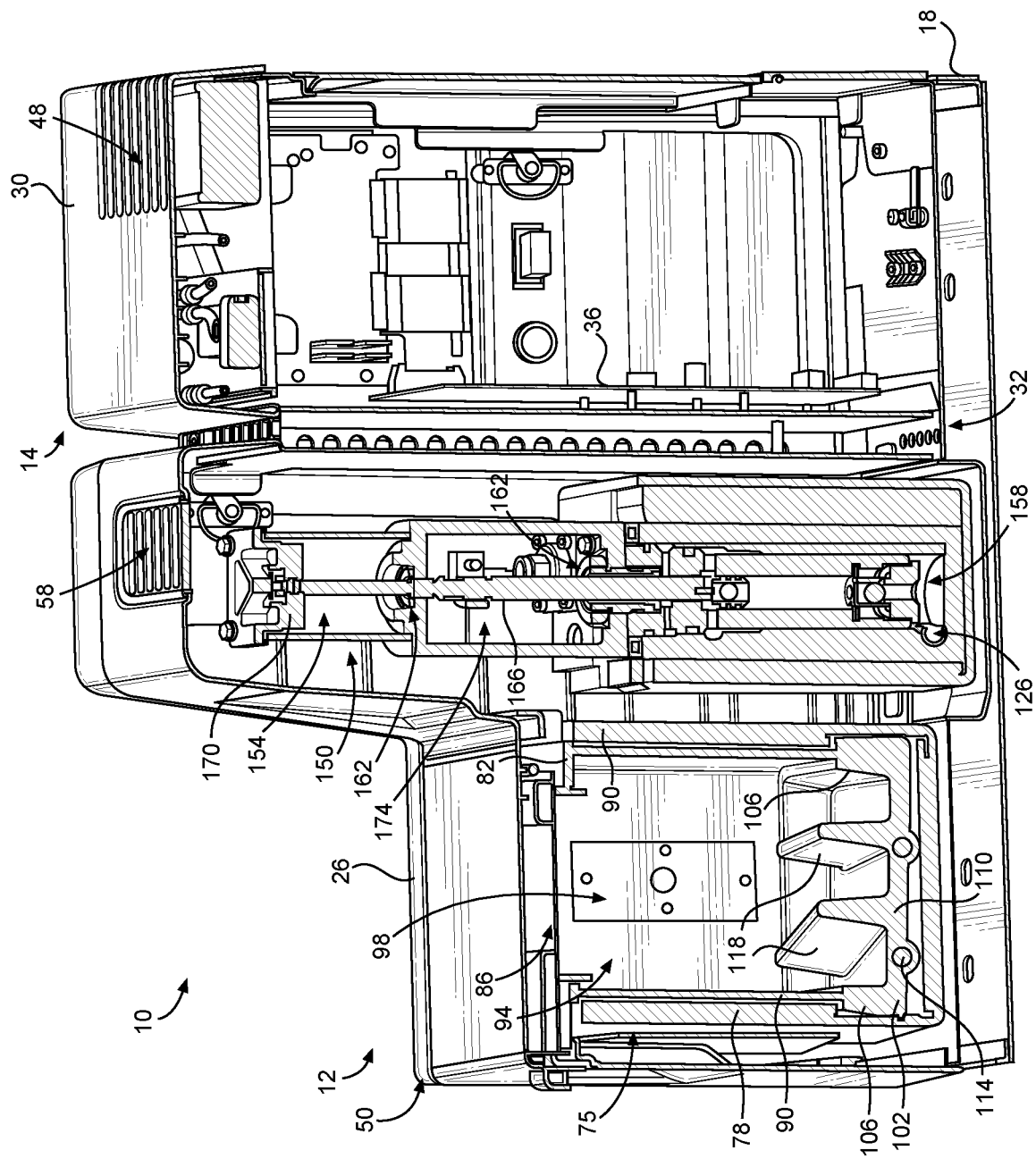
FIG. 3 illustrates an alternative cross-sectional view of the adhesive dispensing device shown in FIG. 1A, taken along line 3-3 shown in FIG. 1A.

As shown in FIG. 1C, the adhesive dispensing device 10 can define a specific footprint F. The lower end of the base 18 can define the footprint F, which can be defined as a cross-sectional shape and area defined by the lower end of the base 18. The footprint F can also, additionally or alternatively, be defined by the collective lower ends of the melt module 12 and the control module 14. As will be described further below, the adhesive dispensing device 10 is modular, such that either or both of the melt module 12 and control module 14 can be detached from the adhesive dispensing device 10 and replaced without affecting the size and or shape of the footprint F of the adhesive dispensing device 10. This can be highly beneficial to an operator of the adhesive dispensing device 10, as the adhesive dispensing device 10 can remain in place while the adhesive dispensing device 10 is reconfigured to replace certain components, potentially in preparation for a new adhesive melting and dispensing operation. Additionally, when setting up an adhesive processing area, the operator only needs to accommodate one shape and size of adhesive dispensing device.

Continuing with FIGS. 1A-3, the adhesive dispensing device 10 can include a melt module cover 26 and a control module cover 30 configured to provide selective access to the melt module 12 and the control module 14, respectively. The melt module cover 26 is configured to house the components of the melt module 12 and at least partially insulate the melt module 12 from the surrounding environment, while the control module cover 30 is configured to house the components of the control module 14, as well as insulate the control module 14 from the melt module 12 and the surrounding environment. The previously-described thermal gap 32 can be specifically defined between the melt module cover 26 and the control module cover 30. The melt module cover 26 can define a vent 58 that can be used to avoid overheating the components of the melt module 12 held within the melt module cover 26. Similarly, the control module cover 30 can define a vent 48 that can be used to avoid overheating the components of the control module 14 held within the control module cover 30. Though one embodiment and arrangement of vents 48, 58 is shown, the adhesive dispensing device 10 can include other embodiments of the vents 48, 58, as well as more vents not depicted or described herein.

The melt module cover 26 substantially encloses a melter subassembly 75 configured to receive and melt solid adhesive. A lid assembly 50 can be attached to the upper end of the melter subassembly 75. The lid assembly 50 can be configured to allow selective access to the interior of the melter subassembly 75, as well as protect the operator from the heat and associated fumes produced by the melter subassembly 75. The lid assembly 50 can include a handle 52 so as to be manually opened by the operator, though it is contemplated that the melt module 12 can include a mechanism for automatically opening the lid assembly 50. In the depicted embodiment, the lid assembly 50 allows the operator to manually open the lid assembly 50 so as to manually load the melt module 12 with solid adhesive as desired. However, it is contemplated that in other embodiments, the lid assembly 50 (or other components of the melt module 12) can include a passage for automatically loading the melt module 12 with solid adhesive from a solid adhesive source spaced from the adhesive dispensing device 10. As shown in FIG. 1B, the melt module 12 can also include a plurality of outputs 54 that are each configured to be in fluid communication with an application device (not shown) so as to convey melted adhesive from the melt module 12 to one or more application devices. As shown, when not connected to an application device, each of the plurality of outputs 54 can be sealed using a plug. Any number or combination of the outputs 54 can be connected to an application device at any instant according to the particular melting and dispensing operation being performed.

The control module 14 can include a controller 36. The controller 36 can comprise any suitable computing device configured to host a software application for monitoring and controlling various operations of the adhesive dispensing device 10 as described herein. It will be understood that the controller 36 can include any appropriate integrated circuit. Specifically, the controller 36 can include a memory and be in signal communication with a human-machine interface (HMI) device 34. The memory can be volatile (such as some types of RAM), non-volatile (such as ROM, flash memory, etc.), or a combination thereof. The controller 36 can include additional storage (e.g., removable storage and/or non-removable storage) including, but not limited to, tape, flash memory, smart cards, CD-ROM, digital versatile disks (DVD) or other optical storage, magnetic tape, magnetic disk storage or other magnetic storage devices, universal serial bus (USB) compatible memory, or any other medium which can be used to store information and which can be accessed by the controller 36. The memory of the controller 36 can be configured to store and recall on demand various metering operations to be performed by the adhesive dispensing device 10. The control module 14 can further include electrical connections 44 extending through the control module cover 30, which can be configured to connect with a power source, external computing devices, etc., so as to transmit power and/or signals to and from the adhesive dispensing device 10.

As noted above, the control module 14 can include an HMI device 34 in signal communication with the controller 36. In the depicted embodiment, the HMI device 34 can include a display, such as an OLED screen. However, it is contemplated that the HMI device 34 can also include, in addition or alternatively, various types of inputs that provide the ability to control the controller 36, via, for example, buttons, soft keys, a mouse, voice actuated controls, a touch screen, movement of the controller 36, visual cues (e.g., moving a hand in front of a camera on the controller 36), or the like. The HMI device 34 can provide outputs via a graphical user interface, including visual information, such as the visual indication of the current conditions within the adhesive dispensing device 10, as well as acceptable ranges for these parameters via a display. Other outputs can include audio information (e.g., via speaker), mechanically (e.g., via a vibrating mechanism), or a combination thereof. In various configurations, the HMI device 34 can include a display, a touch screen, a keyboard, a mouse, a motion detector, a speaker, a microphone, a camera, or any combination thereof. The HMI device 34 can further include any suitable device for inputting biometric information, such as, for example, fingerprint information, retinal information, voice information, and/or facial characteristic information, for instance, so as to require specific biometric information for accessing the controller 36. In addition to the HMI device 34, the control module 14 can include a pressure dial 40, e.g., pressure gauges, for easily displaying pressure readings, such as the air pressure provided to the piston pump 150. The control module 14 can also be configured with a digital pressure transducer (not shown), which can display the air pressure via the HMI device 34.

Additionally, the controller 36 can be in signal communication with a remote device 38 spaced from the control module 14. In one embodiment, the remote device 38 can comprise a display spaced from the control module 14, such as an OLED display, though various types of conventional displays are contemplated. Alternatively, the remote device 38 can comprise an external computing device, examples of which include a processor, a desktop computing device, a server computing device, or a portable computing device, such as a laptop, panel PC, tablet, or smart phone. Accordingly, the remote device 38 can provide the operator with the ability to interact with and control the controller 36 at a distance from the adhesive dispensing device 10. The remote device 38 can be either in wired or wireless communication with the controller 36.

Figure 6:
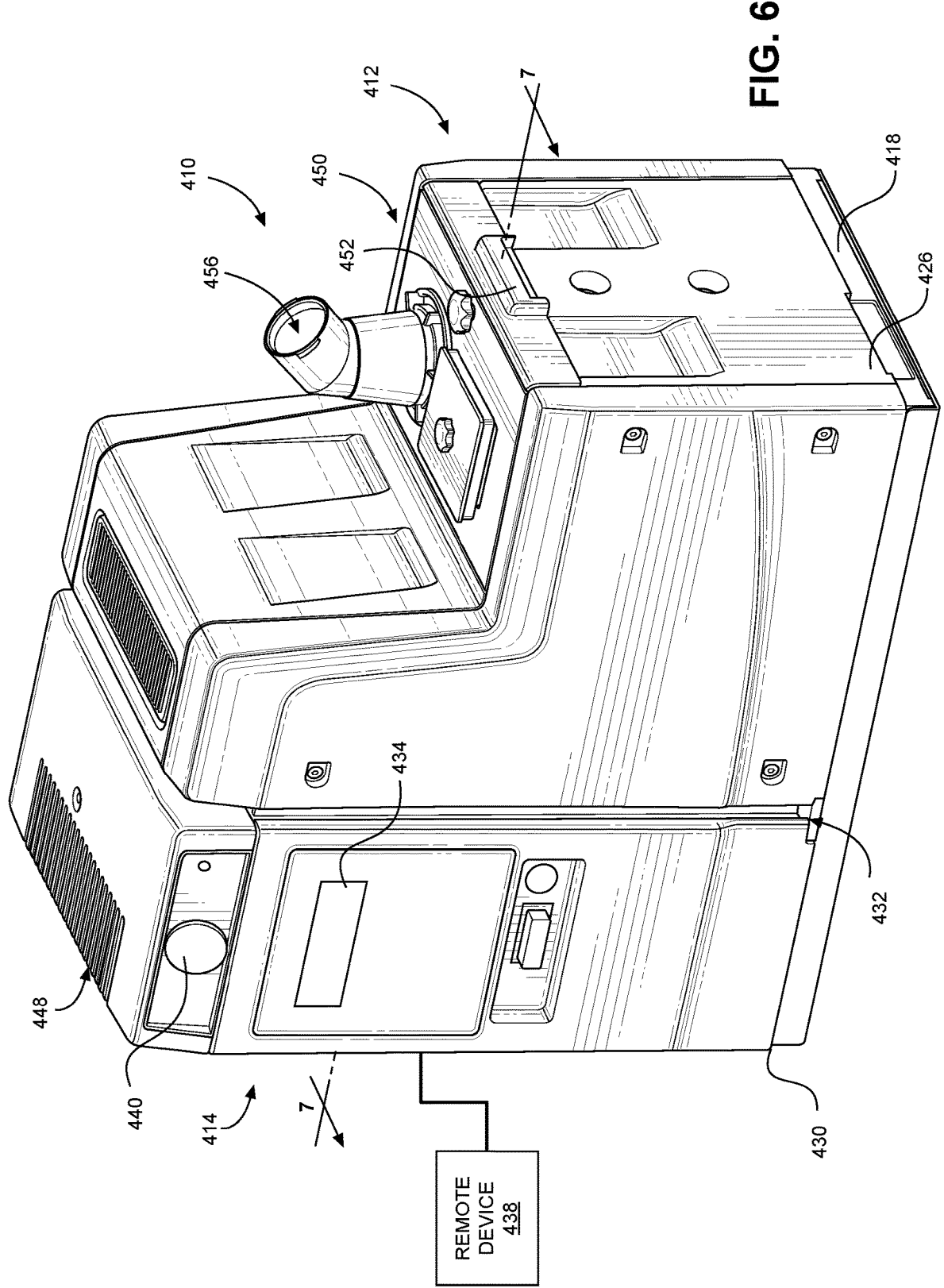
FIG. 6 illustrates a perspective view of an adhesive dispensing device according to another embodiment of the present disclosure.
Figure 7:
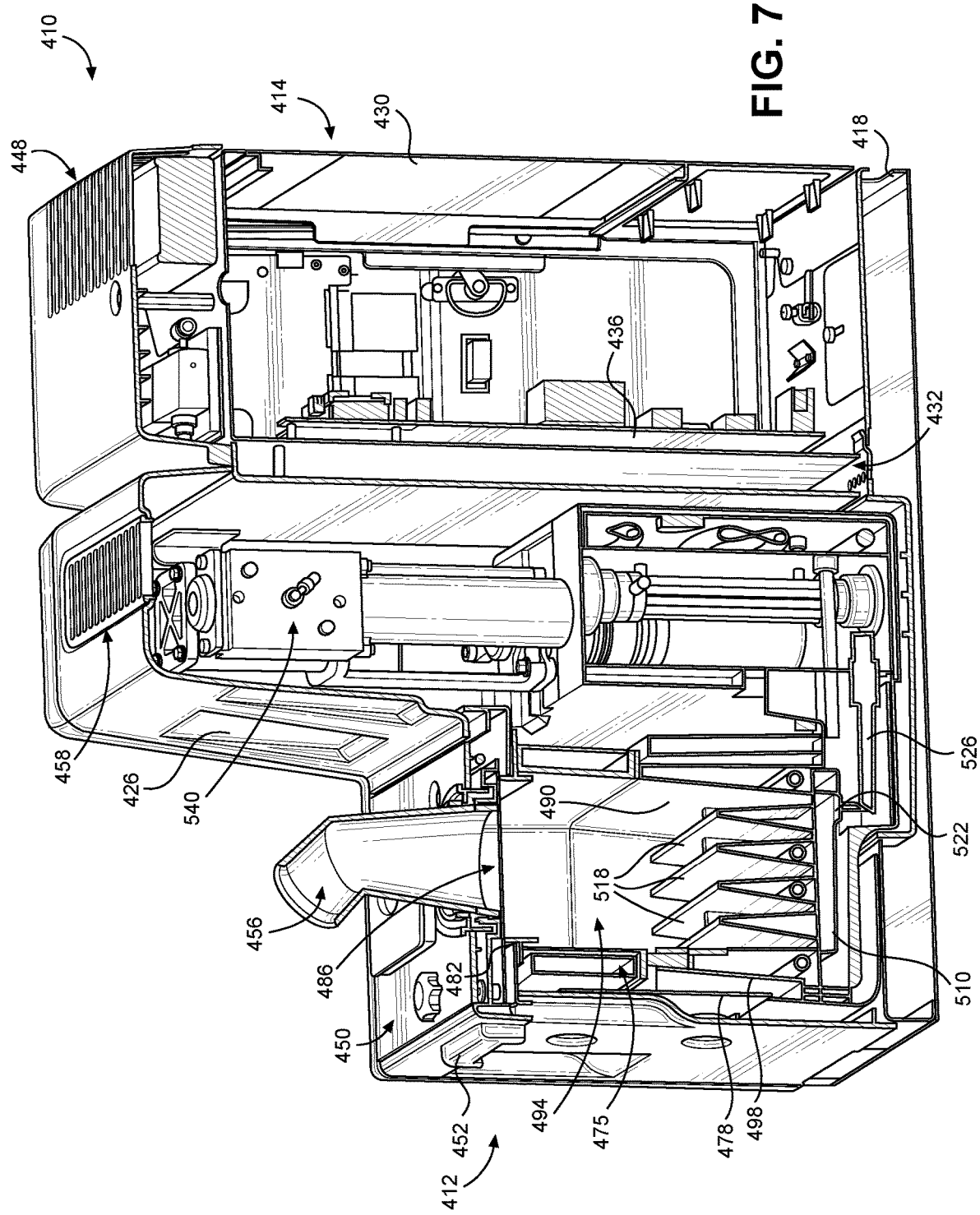
FIG. 7 illustrates a cross-sectional view of the adhesive dispensing device shown in FIG. 6, taken along line 7-7 in FIG. 6.

Continuing with FIGS. 1A-3, the melt module 12 will be described in greater detail. As stated above, the melt module 12 comprises a melter subassembly 75 that can include a plurality of components that are configured to receive pellets of adhesive material, either from manual filling by opening the lid assembly 50 or through an automatic fill mechanism (such as shown in FIGS. 6 and 7), and heat and melt those pellets into molten adhesive at an elevated application temperature. The melt module 12 can also include a pump 150 configured to pressurize and dispense the molten adhesive through the outputs 54 to downstream application devices, such as guns or modules (not shown).

As mentioned above, a lid assembly 50 can be attached to the melter subassembly 75, where a portion of the lid assembly 50 is configured to pivot so as to permit operator access to the melter subassembly 75. The melter subassembly 75 can include a housing 78 that includes a top wall 82, a plurality of sidewalls 90, and a base 102. The base 102 can define a plurality of sidewalls 106 and a bottom wall 110. The base 102 can be a separate component from the housing 78, and thus attached to the housing 78 during assembly of the adhesive dispensing device 10. However, it is contemplated that the housing 78 and the base 102 can define a monolithic structure. In the depicted embodiment, the housing 78 defines a substantially hollow rectangular prism, though other shapes and configurations are contemplated. The housing 78 can be comprised of a substantially conductive material, such as aluminum, that is configured to be heated by the heater 114 so as to heat and melt the adhesive. The housing 78 can define a receiving space 94 that is configured to receive solid material, as well as contain adhesive that has melted. The top wall 82 of the housing 78 can define an opening 86 in communication with the receiving space 94, such that when the lid assembly 50 is pivoted to an open position, material can be manually deposited into the receiving space 94 through the opening 86, but when the lid assembly 50 is in a closed position, the lid assembly 50 can block introduction of adhesive into the receiving space 94 through the opening 86. The receiving space 94 can define a specific volume that is designed for a particular adhesive operation. For example, the receiving space 94 can be configured to receive 4 kg of adhesive, though other sizes are contemplated.

The melter subassembly 75 can further include a level sensor 98 disposed within the receiving space 94. Particularly, the level sensor 98 can be attached to the inner surface of one of the sidewalls 90 of the housing 78 and can be in signal communication with the controller 36 of the control module 14. The level sensor 98 can comprise a capacitive level sensor, though other types of level sensors are contemplated. In operation, the level sensor 98 can monitor the level of material within the receiving space 94 and send signals to the controller 36 that are indicative of the adhesive level.

The melter subassembly 75 can further include a heater 114 configured to heat the housing to melt the adhesive. Though depicted as attached to and at least partially extending through the base 102, the heater 114 can alternatively or additionally be attached to any portion of the melter subassembly 75, such as portions of the housing 78. It will be appreciated that the heater 114 can comprise any type of known heating device configured to melt adhesive within a melter assembly. The melter subassembly 75 can further include a plurality of fins 118 extending upwards from the base 102 and into the receiving space 94, where the fins 118 are configured to be heated by the heater 114 and provide an increased surface area for heating and melting the adhesive. Though a particular number, arrangement, and configuration of the fins 118 is shown, it is contemplated that the fins 118 can be alternatively configured as desired. Additionally, an outlet 122 can be defined in the base 102 and in fluid communication with the receiving space 94, where melted adhesive is configured to flow through the outlet 122 and exit the receiving space 94. A cage 130 can be positioned adjacent the outlet 122, where the cage 130 is configured to act as a filter to prevent adhesive pieces of a particular size that are not melted from reaching the outlet 122, as such adhesive pieces can congeal around and clog the outlet 122. The cage 130 also prevents introduction of foreign matter, such as stray fasteners, debris or tools.

A passage 126 can extend from the outlet 122 to a pump 150 that is also positioned within the melt module cover 26 of the melt module 12. The pump 150 can be a double-acting piston pump, though other types of pumps are contemplated. The pump 150 can include a pneumatic chamber 154, a fluid chamber 158, and one or more seals 162 of seal cartridges disposed between the pneumatic chamber 154 and the fluid chamber 158. A pump rod 166 extends from the fluid chamber 158 to a piston 170 located within the pneumatic chamber 154. Pressurized air is delivered in alternating fashion to the upper and lower sides of the piston 170 to thereby move the pump rod 166 within the pneumatic chamber 154, causing drawing of the molten adhesive into the fluid chamber 158 from the passage 126, and ultimately the receiving space 94, and expelling of the molten adhesive to the outputs 54. The pressurized air may be delivered to the pneumatic chamber 154 through hoses from a pressurized air source (not shown). The pump 150 may be controlled by the controller 36 of the control module 14 to deliver the desired flow rate of molten adhesive through the outputs 54. The pump 150 may be additionally or alternatively controlled by means of manual adjustment of a pressure regulator (not shown) by the user to deliver the desired flow rate of molten adhesive through the outputs 54. The pump 150 can include a control section 174 including a shifter used to mechanically actuate changes in directional movement for the piston 170 and the pump rod 166 near the end limit positions of these elements.

Figure 4:
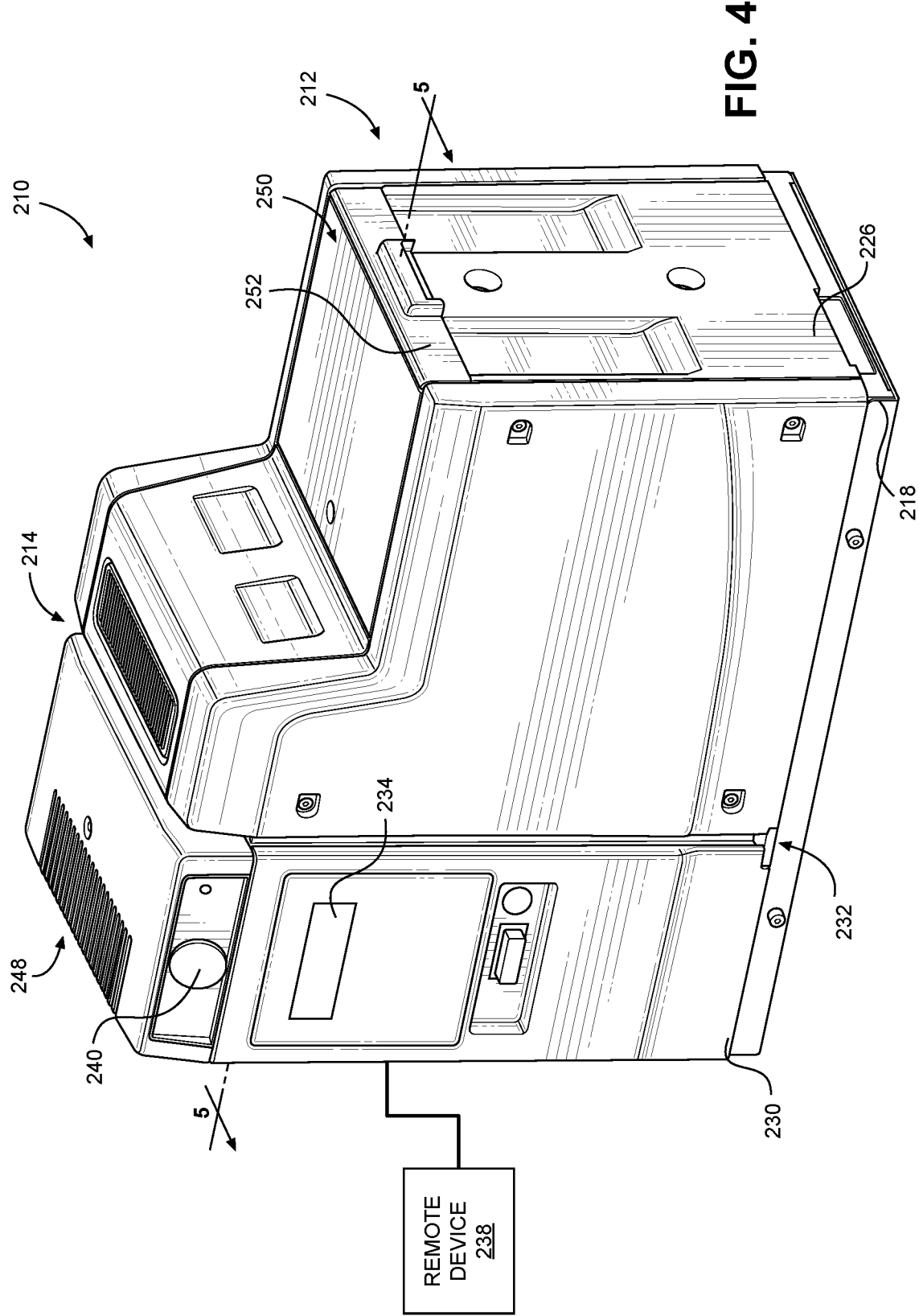
FIG. 4 illustrates a perspective view of an adhesive dispensing device according to another embodiment of the present disclosure.
Figure 5:
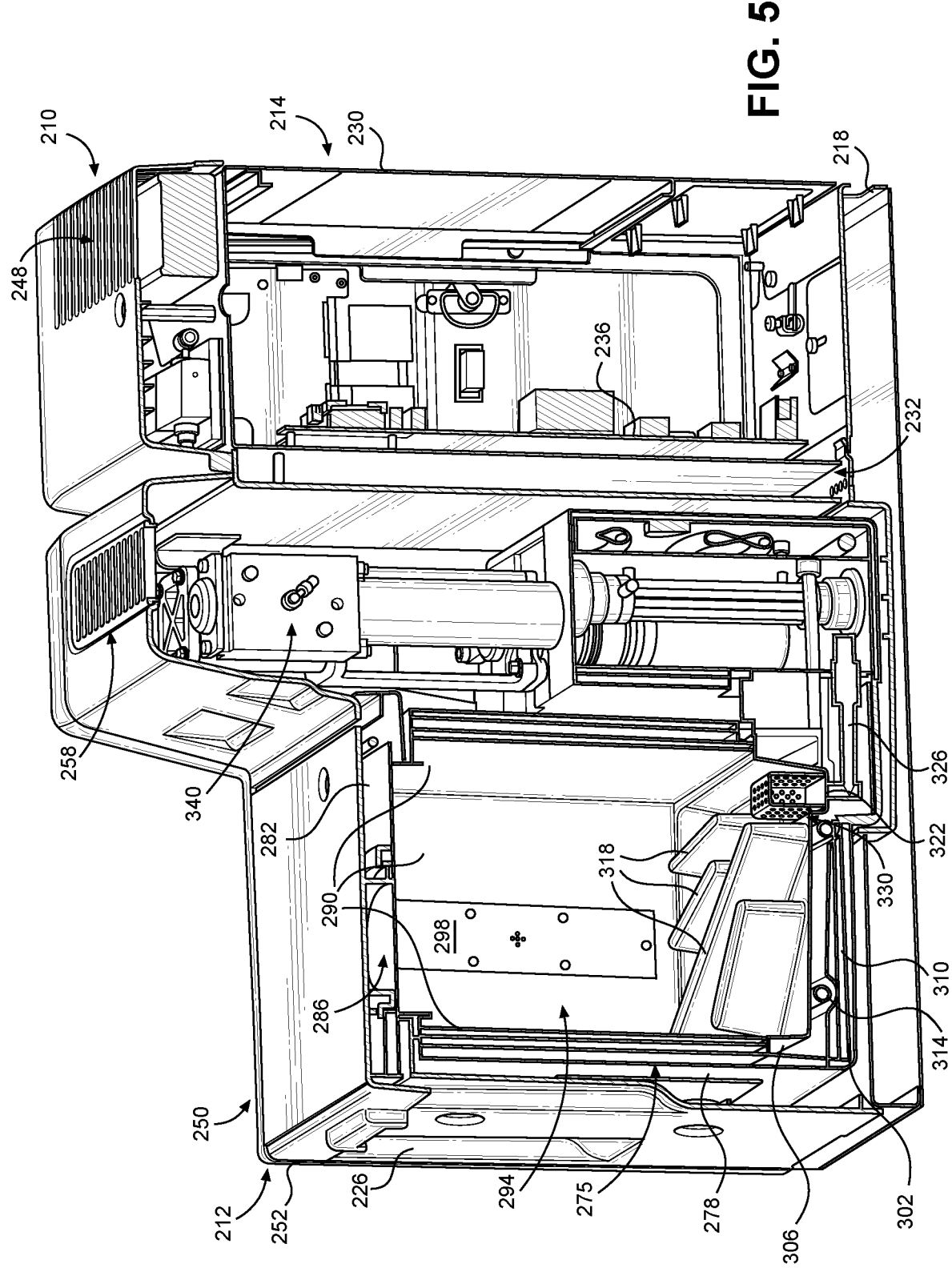
FIG. 5 illustrates a cross-sectional view of the adhesive dispensing device shown in FIG. 4, taken along line 5-5 in FIG. 4.

Now referring to FIGS. 4 and 5, another embodiment of an adhesive dispensing device 210 will be described. The adhesive dispensing device 210 includes a melt module 212 and a control module 214 electrically and/or physically coupled to the melt module 212. The melt module 212 is configured to include the components related to receiving solid adhesive and melting the solid adhesive, whereas the control module 214 is configured to include the electronic components for controlling operation of the melt module 212, where each of the melt module 212 and the control module 214 will be described in detail further below. Each of the melt module 212 and the control module 214 can be mounted to and supported by a base 218. The base 218 can comprise a metal body and is configured to releasably couple to each of the melt module 212 and the control module 214. Like the adhesive dispensing device 10, the adhesive dispensing device 210 is modular in nature, and thus either of the melt module 212 or control module 214 can be detached from the adhesive dispensing device 210 and replaced with another component, such as components of the adhesive dispensing device 10, as will be described below. Various features of the adhesive dispensing device 210, particularly of the melt module 212 and control module 214, are similar to features of the melt module 12 and control module 14 of the adhesive dispensing device 10 described above, and as such will be similarly described here.

When the melt module 212 and the control module 214 are coupled to the base 218, a thermal gap 232 can be defined between the melt module 212 and the control module 214. The thermal gap 232 can be configured to minimize and/or substantially eliminate heat transfer from the melt module 212 to the control module 214 so as to prevent damage to the electronic components contained by the control module 214 caused by the heat created by the melt module 212. The thermal gap 232 can comprise a space between the melt module 212 and the control module 214. Additionally, it is contemplated that the thermal gap 232 can further include materials configured to prevent heat transfer, such as various types of insulation, though any specific type of material or structure is not required.

The adhesive dispensing device 210 can include a melt module cover 226 and a control module cover 230 configured to provide selective access to the melt module 212 and the control module 214, respectively. The melt module cover 226 is configured to house the components of the melt module 212 and at least partially insulate the melt module 212 from the surrounding environment, while the control module cover 230 is configured to house the components of the control module 214, as well as insulate the control module 214 from the melt module 212 and the surrounding environment. The previously-described thermal gap 232 can be specifically defined between the melt module cover 226 and the control module cover 230. The melt module cover 226 can define a vent 258 that can be used to avoid overheating the components of the melt module 212 held within the melt module cover 226. Similarly, the control module cover 230 can define a vent 248 that can be used to avoid overheating the components of the control module 214 held within the control module cover 230. Though one embodiment and arrangement of vents 248, 258 is shown, the adhesive dispensing device 210 can include other embodiments of the vents 248, 258, as well as more vents not depicted or described herein.

The melt module cover 226 substantially encloses a melter subassembly 275 configured to receive and melt solid adhesive. A lid assembly 250 can be attached to the upper end of the melter subassembly 275. The lid assembly 250 can be configured to allow selective access to the interior of the melter subassembly 275, as well as protect the operator from the heat and associate fumes produced by the melter subassembly 275. The lid assembly 250 can include a handle 252 so as to be manually opened by the operator, though it is contemplated that the melt module 212 can include a mechanism for automatically opening the lid assembly 250. In the depicted embodiment, the lid assembly 250 allows the operator to manually open the lid assembly 250 so as to manually load the melt module 212 with solid adhesive as desired. However, it is contemplated that in other embodiments, the lid assembly 250 (or other components of the melt module 212) can include a passage for automatically loading the melt module 212 with solid adhesive from a solid adhesive source spaced from the adhesive dispensing device 210. The melt module 212 can also include a plurality of outputs (not shown) that are each configured to be in fluid communication with an application device (not shown) so as to convey melted adhesive from the melt module 212 to one or more application devices.

The control module 214 can include a controller 236. The controller 236 can comprise any suitable computing device configured to host a software application for monitoring and controlling various operations of the adhesive dispensing device 210 as described herein. It will be understood that the controller 236 can include any appropriate integrated circuit. Specifically, the controller 236 can include a memory and be in signal communication with a human-machine interface (HMI) device 234. The memory can be volatile (such as some types of RAM), non-volatile (such as ROM, flash memory, etc.), or a combination thereof. The controller 236 can include additional storage (e.g., removable storage and/or non-removable storage) including, but not limited to, tape, flash memory, smart cards, CD-ROM, digital versatile disks (DVD) or other optical storage, magnetic tape, magnetic disk storage or other magnetic storage devices, universal serial bus (USB) compatible memory, or any other medium which can be used to store information and which can be accessed by the controller 236. The memory of the controller 236 can be configured to store and recall on demand various metering operations to be performed by the adhesive dispensing device 210.

As noted above, the control module 214 can include an HMI device 234 in signal communication with the controller 236. In the depicted embodiment, the HMI device 234 can include a display, such as an OLED screen. However, it is contemplated that the HMI device 234 can also include, in addition or alternatively, various types of inputs that provide the ability to control the controller 236, via, for example, buttons, soft keys, a mouse, voice actuated controls, a touch screen, movement of the controller 236, visual cues (e.g., moving a hand in front of a camera on the controller 236), or the like. Unlike the HMI device 34, the HMI device 234 is shown as including a particular array of buttons and keys. The HMI device 234 can provide outputs via a graphical user interface, including visual information, such as the visual indication of the current conditions within the adhesive dispensing device 210, as well as acceptable ranges for these parameters via a display. Other outputs can include audio information (e.g., via speaker), mechanically (e.g., via a vibrating mechanism), or a combination thereof. In various configurations, the HMI device 234 can include a display, a touch screen, a keyboard, a mouse, a motion detector, a speaker, a microphone, a camera, or any combination thereof. The HMI device 234 can further include any suitable device for inputting biometric information, such as, for example, fingerprint information, retinal information, voice information, and/or facial characteristic information, for instance, so as to require specific biometric information for accessing the controller 36. In addition to the HMI device 234, the control module 214 can include a pressure dial 240 for easily displaying pressure readings, such as the air pressure provided to a piston pump (e.g., the piston pump 150 of FIG. 3) within the adhesive dispensing device 210. The control module 214 can also be configured with a digital pressure transducer (not shown), which can display the air pressure via the HMI device 234.

Additionally, the controller 236 can be in signal communication with a remote device 238 spaced from the control module 214. In one embodiment, the remote device 238 can comprise a display spaced from the control module 214, such as an OLED display, though various types of conventional displays are contemplated. Alternatively, the remote device 238 can or additionally, the remote device 238 can comprise an external computing device, examples of which include a processor, a desktop computing device, a server computing device, or a portable computing device, such as a laptop, panel PC, tablet, or smart phone. Accordingly, the remote device 238 can provide the operator with the ability to interact with and control the controller 236 at a distance from the adhesive dispensing device 210.

Continuing with FIGS. 4-5, the melt module 212 will be described in greater detail. As stated above, the melt module 212 comprises a melter subassembly 275 that can include a plurality of components that are configured to receive pellets of adhesive material, either from manual filling by opening the lid assembly 250 or through an automatic fill mechanism (such as shown in FIGS. 6 and 7), and heat and melt those pellets into molten adhesive at an elevated application temperature. The melt module 212 can also include a pump 340 configured to pressurize and dispense the molten adhesive through outputs to downstream application devices, such as guns or modules (not shown).

As mentioned above, a lid assembly 250 can be attached to the melter subassembly 275, where a portion of the lid assembly 250 is configured to pivot so as to permit operator access to the melter subassembly 275. The melter subassembly 275 can include a housing 278 that includes a top wall 282, a plurality of sidewalls 290, and a base 302. The base 302 can define a plurality of sidewalls 306 and a bottom wall 310. The base 302 can be a separate component from the housing 278, and thus attached to the housing 278 during assembly of the adhesive dispensing device 210. However, it is contemplated that the housing 278 and the base 302 can define a monolithic structure. In the depicted embodiment, the housing 278 defines a substantially hollow rectangular prism, though other shapes and configurations are contemplated. The housing 278 can be comprised of a substantially conductive material, such as aluminum, that is configured to be heated by the heater 314 so as to heat and melt the adhesive. The housing 278 can define a receiving space 294 that is configured to receive solid material, as well as contain adhesive that has melted. The top wall 282 of the housing 278 can define an opening 286 in communication with the receiving space 294, such that when the lid assembly 250 is pivoted to an open position, material can be manually deposited into the receiving space 294 through the opening 286, but when the lid assembly 250 is in a closed position, the lid assembly 250 can block introduction of adhesive into the receiving space 294 through the opening 286. The receiving space 294 can define a specific volume that is designed for a particular adhesive operation. For example, the receiving space 294 can be configured to receive 10 kg of adhesive, though other sizes are contemplated. As such, the volume of the receiving space 294 of the adhesive dispensing device 210 is larger than the volume of the receiving space 94 of the adhesive dispensing device 10.

The melter subassembly 275 can further include a level sensor 298 disposed within the receiving space 294. Particularly, the level sensor 298 can be attached to the inner surface of one of the sidewalls 290 of the housing 278, and can be in signal communication with the controller 236 of the control module 214. The level sensor 298 can comprise a capacitive level sensor, though other types of level sensors are contemplated. In operation, the level sensor 298 can monitor the level of material within the receiving space 294 and send signals to the controller 236 that are indicative of the adhesive level.

The melter subassembly 275 can further include a heater 314 configured to heat the housing to melt the adhesive. Though depicted as attached to and at least partially extending through the base 302, the heater 314 can alternatively or additionally be attached to any portion of the melter subassembly 275, such as portions of the housing 278. It will be appreciated that the heater 314 can comprise any type of known heating device configured to melt adhesive within a melter assembly. The melter subassembly 275 can further include a plurality of fins 318 extending upwards from the base 302 and into the receiving space 294, where the fins 318 are configured to be heated by the heater 314 and provide an increased surface area for heating and melting the adhesive. Though a particular number, arrangement, and configuration of the fins 318 is shown, it is contemplated that the fins 318 can be alternatively configured as desired. Additionally, an outlet 322 can be defined in the base 302 and in fluid communication with the receiving space 294, where melted adhesive is configured to flow through the outlet 322 and exit the receiving space 294. A cage 330 can be positioned adjacent the outlet 322, where the cage 330 is configured to act as a filter to prevent adhesive pieces of a particular size that are not melted from reaching the outlet 322, as such adhesive pieces can congeal around and clog the outlet 322. The cage 330 can also prevent the introduction of foreign objects, such as stray fasteners, debris, or tools. A passage 326 can extend from the outlet 322 to a pump 340 that is also positioned within the melt module cover 226 of the melt module 212. The pump 340 can be a double-acting piston pump, though other types of pumps are contemplated.

Now referring to FIGS. 6 and 7, another embodiment of an adhesive dispensing device 410 will be described. The adhesive dispensing device 410 includes a melt module 412 and a control module 414 electrically and/or physically coupled to the melt module 412. The melt module 412 is configured to include the components related to receiving solid adhesive and melting the solid adhesive, whereas the control module 414 is configured to include the electronic components for controlling operation of the melt module 412, where each of the melt module 412 and the control module 414 will be described in detail further below. Each of the melt module 412 and the control module 414 can be mounted to and supported by a base 418. The base 418 can comprise a metal body and is configured to releasably couple to each of the melt module 412 and the control module 414. Like the adhesive dispensing devices 10, 210, the adhesive dispensing device 410 is modular in nature, and thus either of the melt module 412 or control module 414 can be detached from the adhesive dispensing device 410 and replaced with another component, such as components from the adhesive dispensing devices 10, 210, as will be described below. Various features of the adhesive dispensing device 410, particularly of the melt module 412 and control module 414, are similar to features of the melt modules 12, 212 and control modules 14, 214 of the adhesive dispensing devices 10, 210, respectively, as described above, and as such will be similarly described here.

When the melt module 412 and the control module 414 are coupled to the base 418, a thermal gap 432 can be defined between the melt module 412 and the control module 414. The thermal gap 432 can be configured to minimize and/or substantially eliminate heat transfer from the melt module 412 to the control module 414 so as to prevent damage to the electronic components contained by the control module 414 caused by the heat created by the melt module 412. The thermal gap 432 can comprise a space between the melt module 412 and the control module 414. Additionally, it is contemplated that the thermal gap 432 can further include materials configured to prevent heat transfer, such as various types of insulation, though any specific type of material or structure is not required.

The adhesive dispensing device 410 can include a melt module cover 426 and a control module cover 430 configured to provide selective access to the melt module 212 and the control module 214, respectively. The melt module cover 426 is configured to house the components of the melt module 412 and at least partially insulate the melt module 412 from the surrounding environment, while the control module cover 430 is configured to house the components of the control module 414, as well as insulate the control module 414 from the melt module 412 and the surrounding environment. The previously-described thermal gap 432 can be specifically defined between the melt module cover 426 and the control module cover 430. The melt module cover 426 can define a vent 458 that can be used to avoid overheating the components of the melt module 412 held within the melt module cover 426. Similarly, the control module cover 430 can define a vent 448 that can be used to avoid overheating the components of the control module 414 held within the control module cover 430. Though one embodiment and arrangement of vents 448, 458 is shown, the adhesive dispensing device 410 can include other embodiments of the vents 448, 458, as well as more vents not depicted or described herein.

The melt module cover 426 substantially encloses a melter subassembly 275 configured to receive and melt solid adhesive. A lid assembly 450 can be attached to the upper end of the melter subassembly 475. The lid assembly 450 can be configured to allow selective access to the interior of the melter subassembly 475, as well as protect the operator from the heat and associate fumes produced by the melter subassembly 475. The lid assembly 450 can include a handle 452 so as to be manually opened by the operator, though it is contemplated that the melt module 412 can include a mechanism for automatically opening the lid assembly 450. In contrast with the lid assemblies 50, 250, in the depicted embodiment, the lid assembly 450 includes an input passage 456 for automatically loading the melt module 412 with solid adhesive from a solid adhesive source spaced from the adhesive dispensing device 410. The melt module 412 can also include a plurality of outputs (not shown) that are each configured to be in fluid communication with an application device (not shown) so as to convey melted adhesive from the melt module 412 to one or more application devices.

The control module 414 can include a controller 436. The controller 436 can comprise any suitable computing device configured to host a software application for monitoring and controlling various operations of the adhesive dispensing device 410 as described herein. It will be understood that the controller 436 can include any appropriate integrated circuit. Specifically, the controller 436 can include a memory and be in signal communication with a human-machine interface (HMI) device 434. The memory can be volatile (such as some types of RAM), non-volatile (such as ROM, flash memory, etc.), or a combination thereof. The controller 436 can include additional storage (e.g., removable storage and/or non-removable storage) including, but not limited to, tape, flash memory, smart cards, CD-ROM, digital versatile disks (DVD) or other optical storage, magnetic tape, magnetic disk storage or other magnetic storage devices, universal serial bus (USB) compatible memory, or any other medium which can be used to store information and which can be accessed by the controller 436. The memory of the controller 436 can be configured to store and recall on demand various metering operations to be performed by the adhesive dispensing device 410.

As noted above, the control module 414 can include an HMI device 434 in signal communication with the controller 436. In the depicted embodiment, the HMI device 434 can include a display, such as an OLED screen. However, it is contemplated that the HMI device 434 can also include, in addition or alternatively, various types of inputs that provide the ability to control the controller 436, via, for example, buttons, soft keys, a mouse, voice actuated controls, a touch screen, movement of the controller 436, visual cues (e.g., moving a hand in front of a camera on the controller 436), or the like. The HMI device 434 can provide outputs via a graphical user interface, including visual information, such as the visual indication of the current conditions within the adhesive dispensing device 410, as well as acceptable ranges for these parameters via a display. Other outputs can include audio information (e.g., via speaker), mechanically (e.g., via a vibrating mechanism), or a combination thereof. In various configurations, the HMI device 434 can include a display, a touch screen, a keyboard, a mouse, a motion detector, a speaker, a microphone, a camera, or any combination thereof. The HMI device 434 can further include any suitable device for inputting biometric information, such as, for example, fingerprint information, retinal information, voice information, and/or facial characteristic information, for instance, so as to require specific biometric information for accessing the controller 436. In addition to the HMI device 434, the control module 414 can include a pressure dial 440 for easily displaying pressure readings, such as the air pressure provided to a piston pump (e.g., the piston pump 150 of FIG. 3) within the adhesive dispensing device 410.

Additionally, the controller 436 can be in signal communication with a remote device 438 spaced from the control module 414. In one embodiment, the remote device 438 can comprise a display spaced from the control module 414, such as an OLED display, though various types of conventional displays are contemplated. Alternatively, the remote device 438 can or additionally, the remote device 438 can comprise an external computing device, examples of which include a processor, a desktop computing device, a server computing device, or a portable computing device, such as a laptop, panel PC, tablet, or smart phone. Accordingly, the remote device 438 can provide the operator with the ability to interact with and control the controller 436 at a distance from the adhesive dispensing device 410. The control module 414 can also be configured with a digital pressure transducer (not shown), which can display the air pressure via the HMI device 434.

Continuing with FIGS. 6-7, the melt module 412 will be described in greater detail. As stated above, the melt module 412 comprises a melter subassembly 475 that can include a plurality of components that are configured to receive pellets of adhesive material through the input passage 456, and heat and melt those pellets into molten adhesive at an elevated application temperature. The melt module 412 can also include a pump 540 configured to pressurize and dispense the molten adhesive through outputs to downstream application devices, such as guns or modules (not shown).

As mentioned above, a lid assembly 450 can be attached to the melter subassembly 475, where a portion of the lid assembly 450 is configured to pivot so as to permit operator access to the melter subassembly 475. The melter subassembly 475 can include a housing 478 that includes a top wall 482, a plurality of sidewalls 490, and a bottom wall 510. In the depicted embodiment, the housing 478 defines a substantially hollow rectangular prism, though other shapes and configurations are contemplated. The housing 478 can be comprised of a substantially conductive material, such as aluminum, that is configured to be heated by a heater (not shown) so as to heat and melt the adhesive. The housing 478 can define a receiving space 494 that is configured to receive solid material, as well as contain adhesive that has melted. The top wall 482 of the housing 478 can define an opening 486 in communication with the receiving space 494, such that adhesive flowing through the input passage 456 can enter the receiving space 494 through the opening 486.

The melter subassembly 475 can further include a level sensor 498 disposed within the receiving space 494. Particularly, the level sensor 498 can be attached to the inner surface of one of the sidewalls 490 of the housing 478, and can be in signal communication with the controller 436 of the control module 414. The level sensor 498 can comprise a capacitive level sensor, though other types of level sensors are contemplated. In operation, the level sensor 498 can monitor the level of material within the receiving space 494 and send signals to the controller 436 that are indicative of the adhesive level. When the level sensor 498 detects that the level of adhesive within the receiving space 494 is below a predetermined level, the controller 436 instructs the adhesive source to provide the melter subassembly 475 with adhesive through the input passage 456.

The melter subassembly 475 can further include a heater (not shown) configured to heat the housing to melt the adhesive. It will be appreciated that the heater can comprise any type of known heating device configured to melt adhesive within a melter assembly. The melter subassembly 475 can further include a plurality of fins 518 extending upwards from the housing 478 and into the receiving space 494, where the fins 518 are configured to be heated by the heater and provide an increased surface area for heating and melting the adhesive. Though a particular number, arrangement, and configuration of the fins 518 is shown, it is contemplated that the fins 518 can be alternatively configured as desired. Additionally, an outlet 522 can be defined in the housing 478 and in fluid communication with the receiving space 494, where melted adhesive is configured to flow through the outlet 522 and exit the receiving space 494. A passage 526 can extend from the outlet 522 to a pump 540 that is also positioned within the melt module cover 426 of the melt module 412. The pump 540 can be a double-acting piston pump, though other types of pumps are contemplated.

As stated above, the adhesive dispensing devices 10, 210, 410 are modular in nature. As a result, the melt modules 12, 212, 412 and control modules 14, 214, 414 can be detached from the adhesive dispensing device 10, 210, 410 from which they are attached and replaced with a different one of the above described components and/or melt modules and control modules not described herein. When a melt module 12, 212, 412 or control module 14, 214, 414 is replaced, the particular control module 14, 214, 414 that is part of the adhesive dispensing device 10, 210, 410 at issue is configured to automatically recognize a characteristic associated with the melt module 12, 212, 412 currently attached to the control module 14, 214, 414. Subsequently, the control module 14, 214, 414 is configured to operate the melt module 12, 212, 412 using instructions stored on the controller 36, 236, 436 that correspond to the characteristic of the particular melt module 12, 212, 412. By providing the ability to recognize the type of melt module 12, 212, 412 and automatically begin operation of the melt module 12, 212, 412 using operations tailored specifically to that type of melt module 12, 212, 412, the adhesive dispensing devices 10, 210, 410 described herein simplify customization and subsequent setup for an operator of the adhesive dispensing device 10, 210, 410, as well as reduce startup costs and operational errors related to a newly customized device.

One characteristic of a particular melt module 12, 212, 412 that can be recognized by the control module 14, 214, 414 and affect operation of the melt module 12, 212, 412 is the volume of the respective receiving space 94, 294, 494. For example, the receiving space 294 of the adhesive dispensing device 210 is larger than the receiving space 94 of the adhesive dispensing device 10. Receiving spaces of different sizes may be advantageous in different adhesive operations, largely due to differing adhesive storage needs, and the ability to easily transition between melt modules having differently sized receiving spaces provides an operator with a great amount of operational flexibility.

Another characteristic of a particular melt module 12, 212, 412 that can be recognized by the control module 14, 214, 414 and affect operation of the melt module 12, 212, 412 is whether the melt module 12, 212, 412 has a manual fill mechanism or an automatic fill mechanism. As described above, the adhesive dispensing devices 10, 210 can be manually filled with adhesive by opening the lid assembly 50, 250 (manual fill mechanism). In contrast, the adhesive dispensing device 410 can be automatically filled with adhesive through the input passage 456 (automatic fill mechanism). Manual and automatic fill mechanisms can each be desirable in different operations, and the ability to easily change between either helps streamline changes to adhesive processing operations. In additional to receiving space volume and fill characteristics, the control module 14, 214, 414 can be configured to automatically recognize additional characteristics of the melt module 12, 212, 412, such as heater type, number of heaters, pump type, output configuration, etc.

In addition to automatically recognizing characteristics of the melt module 12, 212, 412, the control module 14, 214, 414 can be configured to display the characteristic for review and verification by the operator. This prevents an adhesive dispensing system from being incorrectly set up and allows various personnel to be continuously apprised of the configuration of any adhesive dispensing device at issue. In one embodiment, the HMI device 34, 234, 434 includes a display configured to produce an output indicative of the characteristic of the melt module 12, 212, 412. In other embodiments, this output can be produced by the remote device 38, 238, 438.

Figure 8:
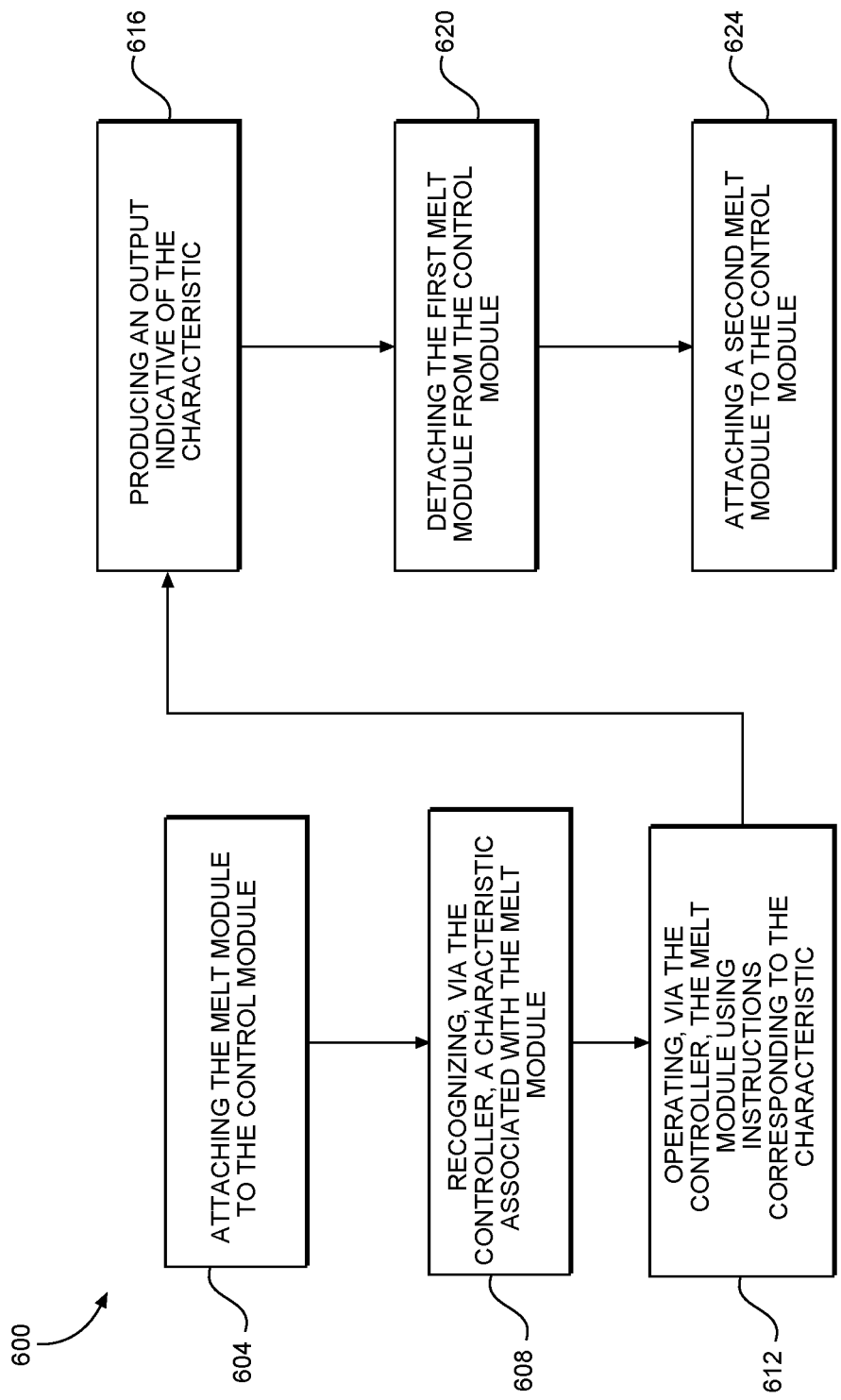
FIG. 8 illustrates a process flow diagram of a method of operating an adhesive dispensing device according to an embodiment of the present disclosure.

Now referring to FIG. 8, a method 600 of operating an adhesive dispensing device 10, 210, 410 according to an embodiment of the present disclosure will be described. Step 604 of method 600 includes attaching the melt module 12, 212, 412 to the control module 14, 214, 414. Then, in step 608, the controller 36, 236, 436 recognizes a characteristic associated with the melt module 12, 212, 412. As previously stated, the characteristic can comprise a volume of the receiving space 94, 294, 494 of the melt module 12, 212, 412, a fill type (automatic or manual) of the melt module 12, 212, 412, etc. Then, in step 612, the controller 36, 236, 436 operates the melt module using instructions stored on the controller 36, 236, 436 that correspond to the characteristic of the melt module 12, 212, 412.

In step 616, an output representative of the characteristic can be displayed. The output can be produced by the HMI device 34, 234, 434, or alternatively by the remote device 38, 238, 438. As described above, the remote device can comprise a remote display and/or an external computing device, such as a cellular device, tablet, panel PC, or laptop. In step 620, the first melt module 12, 212 412 can be detached from the control module 14, 214, 414. Then, step 624 can include attaching a second melt module 12, 212, 412 to the control module 14, 214, 414. When connected, lower ends of the control module 14, 214, 414 and the first melt module 12, 212, 412 can define a first footprint that is substantially identical to a second footprint defined by the lower ends of the control modules 14, 214, 414 and the second melt modules 12, 212, 412. The first and second melt modules 12, 212, 412 an differ in that they have different receiving space volumes, different fill types (manual or automatic), etc.

The HMI device 34 is not a touch screen, whereas the HMI device 234 can be a touch sensitive OLED screen. The two HMI devices, 34, 234 can be replaced for one another. Also, both HMI devices, 34, 234 can have the same connector, such as one or more ribbon connectors, to the control module 14, 214, 414.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts, and features of the inventions-such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features, and concepts may be expressly identified herein as being inventive or forming part of an invention, such identification is not intended to be exclusive, but rather there may be inventive aspects, concepts, and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. An adhesive dispensing device, comprising:
a melt module including a housing that defines a receiving space configured to receive an adhesive and a heater configured to heat the housing to melt the adhesive; and
a control module releasably connected to the melt module, wherein the control module includes a controller configured to automatically recognize a characteristic of the melt module selected from a plurality of characteristics of the melt module and operate the melt module using instructions stored on a non-transitory computer readable medium of the controller that correspond to the selected characteristic of the melt module,
wherein the selected characteristic of the melt module is selected from the group consisting of (a) a volume of the receiving space selected from a plurality of volumes and (b) whether the melt module comprises either a manual fill mechanism or an automatic fill mechanism.

2. The adhesive dispensing device of claim 1, wherein the selected characteristic of the melt module is the volume of the receiving space selected from the plurality of volumes.

3. The adhesive dispensing device of claim 1, wherein the selected characteristic of the melt module is whether the melt module comprises either the manual fill mechanism or the automatic fill mechanism.

4. The adhesive dispensing device of claim 1, further comprising a base releasably attached to the melt module and the control module.

5. The adhesive dispensing device of claim 1, wherein the control module further includes a display in signal communication with the controller.

6. The adhesive dispensing device of claim 5, wherein the display is configured to produce an output indicative of the selected characteristic of the melt module for review and verification by an operator of the adhesive dispensing device.

7. The adhesive dispensing device of claim 1, wherein the controller is in signal communication with a display spaced from the control module.

8. The adhesive dispensing device of claim 1, wherein the controller is in signal communication with an external computing device.

9. The adhesive dispensing device of claim 1, wherein a thermal gap is defined between the control module and the melt module.

10. The adhesive dispensing device of claim 1, wherein the melt module includes one or more heaters and the selected characteristic of the melt module comprises a characteristic of the one or more heaters.

11. The adhesive dispensing device of claim 1, wherein the melt module includes a pump and the selected characteristic of the melt module comprises a characteristic of the pump.

12. An adhesive dispensing device, comprising:
a melt module including a housing that defines a receiving space configured to receive adhesive and a heater configured to heat the housing to melt the adhesive;
a control module releasably connected to the melt module, wherein the control module includes a controller configured to automatically recognize a characteristic associated with the melt module and operate the melt module using instructions stored on a non-transitory computer readable medium of the controller that correspond to the characteristic of the melt module; and
a base releasably attached to the melt module and the control module, wherein the melt module is configured to be detached from the base without detaching the control module from the base.

13. A method of operating an adhesive dispensing device, the method comprising:
attaching a melt module to a base that includes a control module, the control module including a controller;
recognizing, via the controller, a characteristic of the melt module selected from a plurality of characteristics of the melt module; and
operating, via the controller, the melt module using instructions stored on a non-transitory computer readable medium of the controller that correspond to the selected characteristic of the melt module,
wherein the selected characteristic of the melt module is selected from the group consisting of (a) a volume of a receiving space of the melt module selected from a plurality of volumes and (b) whether the melt module comprises a manual fill mechanism or an automatic fill mechanism.

14. The method of claim 13, wherein the control module includes a display, the method further comprising:
producing, via the display, an output indicative of the selected characteristic of the melt module for review and verification by an operator of the adhesive dispensing device.

15. The method of claim 13, further comprising:
producing, via a remote display spaced from the control module, an output indicative of the selected characteristic of the melt module for review and verification by an operator of the adhesive dispensing device.

16. The method of claim 13, further comprising:
producing, via an external computing device, an output indicative of the selected characteristic of the melt module for review and verification by an operator of the adhesive dispensing device.

17. The method of claim 16, wherein the external computing device is a cellular device, a tablet, a panel PC, or a laptop.

18. A method of operating an adhesive dispensing device, comprising:
attaching a first melt module to a base that includes a control module, the control module including a controller and the base defining a footprint when the control module and the first melt module are connected;
recognizing, via the controller, a characteristic associated with the first melt module;
operating, via the controller, the first melt module using instructions stored on a non-transitory computer readable medium of the controller that correspond to the characteristic of the first melt module;
detaching the first melt module from the control module; and
attaching a second melt module that is different than the first melt module to the base, wherein the footprint of the base does not change when the first melt module or the second melt module is connected to the base.

19. The method of claim 18, wherein a receiving space of the first melt module defines a first volume and a receiving space of the second melt module defines a second volume that is different than the first volume.

20. The method of claim 18, wherein a receiving space of the first melt module is configured to be manually filled, and a receiving space of the second melt module is configured to be automatically filled.

* * * * *